United States Patent [19]

Ransom et al.

[11] Patent Number: 4,701,906
[45] Date of Patent: Oct. 20, 1987

[54] PACKET SWITCHING NETWORK WITH MULTIPLE PACKET DESTINATIONS

[75] Inventors: Maurice N. Ransom, Naperville; Wing N. Toy, Glen Ellyn, both of Ill.

[73] Assignees: American Telephone and Telegraph Company; AT&T Bell Laboratories, both of Murray Hill, N.J.

[21] Appl. No.: 749,562

[22] Filed: Jun. 27, 1985

[51] Int. Cl.$^4$ .................... H04Q 11/04; H04J 3/24
[52] U.S. Cl. .......................... 370/60; 370/94; 370/110.1
[58] Field of Search ............ 370/60, 94, 110.1, 85, 370/58

[56] References Cited

U.S. PATENT DOCUMENTS

| | | | |
|---|---|---|---|
| 4,049,906 | 9/1977 | Hafner et al. | 178/2 |
| 4,399,531 | 8/1983 | Grande et al. | 370/60 |
| 4,433,411 | 2/1984 | Gefroersr et al. | 370/94 |
| 4,488,288 | 12/1984 | Turner | 370/60 |
| 4,516,238 | 5/1985 | Huang et al. | 370/60 |
| 4,527,267 | 7/1985 | Cohen | 370/94 |

OTHER PUBLICATIONS

"Distributed Routing and Relay Management in Mobile Packet Radio Network", Compcon '80—20-First IEEE Computer Society International Conference, Sep. 23-25, 1980, (New York, U.S.), J. Liu, pp. 235-243.
"Routing Techniques Used in Computer Communication Networks", IEEE Transactions on Communications, vol. COM-28, No. 4, Apr., 1980, (New York, U.S.), M. Schwartz, et al., pp. 539-552.
"Proposed Organisation for Packet-switched Data Communication Network", *Proceedings of the IEEE*, vol. 119, No. 12, Dec., 1972, (London, GB), T. H. Beeforth, et al., pp. 1677-1682.

Primary Examiner—Douglas W. Olms
Assistant Examiner—Curtis Kuntz
Attorney, Agent, or Firm—John C. Moran

[57] ABSTRACT

A communication method and packet switching network in which self-routing packets are communicated to a single-destination port of the switching network, a plurality of grouped destination ports or to two distinct destination ports after the modification by the switching network of the self-contained routing information within the packets. The packet switching network has a plurality of stages with each stage comprising a plurality of switch nodes, and the communicated packets can be of the single-destination, broadcast, or multiple-destination types of packets. The routing information within the packet comprises pairs of data bits with each pair associated with a stage of the switching network and with the value of the pair of bits determines the type of packet for the corresponding stage. Each switching node has two input and two output terminals, and a switch node in a particular stage is responsive to a single-destination packet received on an input terminal to communicate the packet to the output terminal designated by the value of the pair of bits for that stage. A switch node is responsive to a broadcast type packet to communicate the packet to both output terminals. In response to a split-destination packet, a switch node examines the next pair of bits of the routing information relative to the pair corresponding to the switch node in order to form two new single-destination packets from the split-destination packet. The routing information of the split-destination packet is only modified with respect to this next pair of bits.

18 Claims, 19 Drawing Figures

FIG. 3

| START BIT | PACKET LENGTH | DEST TRUNK CNTRLR | SOURCE TRUNK CNTRLR | CONTROL | ARRIVAL TIME | PACKET IDENTIFIER | | | TIME STAMP | | DATA | CRC |
|---|---|---|---|---|---|---|---|---|---|---|---|---|
| | | 10011010 | 60 | 0 | | | 1 | LOGICAL ADDRESS | | 2 | | |

FIG. 4

| START BIT | PACKET LENGTH | DEST TRUNK CNTRLR | SOURCE TRUNK CNTRLR | CONTROL | ARRIVAL TIME | PACKET IDENTIFIER | | | TIME STAMP | | DATA | CRC |
|---|---|---|---|---|---|---|---|---|---|---|---|---|
| | | 01101010 | 60 | 0 | | | 1 | LOGICAL ADDRESS | | 2 | | |

FIG. 5

| START BIT | PACKET LENGTH | DEST TRUNK CNTRLR | SOURCE TRUNK CNTRLR | CONTROL | ARRIVAL TIME | PACKET IDENTIFIER | | | TIME STAMP | | DATA | CRC |
|---|---|---|---|---|---|---|---|---|---|---|---|---|
| | | 10101001 | 60 | 0 | | | 1 | LOGICAL ADDRESS | | 2 | | |

| PACKET LENGTH | DEST TRUNK CNTRLR | SOURCE TRUNK CNTRLR | CONTROL | ARRIVAL TIME | PACKET IDENTIFIER | | LOGICAL ADDRESS | TIME STAMP | | DATA | CRC |
|---|---|---|---|---|---|---|---|---|---|---|---|
| | 11111001 | 60 | 0 | | 1 | | | | 2 | | |

START BIT

FIG. 10

| PACKET LENGTH | DEST TRUNK CNTRLR | SOURCE TRUNK CNTRLR | CONTROL | ARRIVAL TIME | PACKET IDENTIFIER | | LOGICAL ADDRESS | TIME STAMP | | DATA | CRC |
|---|---|---|---|---|---|---|---|---|---|---|---|
| | 11100111 | 60 | 0 | | 1 | | | | 2 | | |

START BIT

FIG. 11

| PACKET LENGTH | DEST TRUNK CNTRLR | SOURCE TRUNK CNTRLR | CONTROL | ARRIVAL TIME | PACKET IDENTIFIER | | LOGICAL ADDRESS | TIME STAMP | | DATA | CRC |
|---|---|---|---|---|---|---|---|---|---|---|---|
| | 10010010 | 60 | 0 | | 1 | | | | 2 | | |

START BIT

FIG. 12

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| • | | 01001010 | 60 | 0 | | 1 | | 2 | | |

FIG. 13

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| • | | 00101001 | 60 | 0 | | 1 | | 2 | | |

00101001: ADDRESS FOR UPPER PATH / ADDRESS FOR LOWER PATH

FIG. 14

| START BIT | PACKET LENGTH | DEST TRUNK CNTRLR / SOURCE TRUNK CNTRLR | | CONTROL | ARRIVAL TIME | PACKET IDENTIFIER | | LOGICAL ADDRESS | TIME STAMP | DATA | CRC |
|---|---|---|---|---|---|---|---|---|---|---|---|
| • | | 10100100 | 60 | 0 | | 1 | | | 2 | | |

FIG. 15

| START BIT | PACKET LENGTH | DEST TRUNK CNTRLR / SOURCE TRUNK CNTRLR | | CONTROL | ARRIVAL TIME | PACKET IDENTIFIER | | LOGICAL ADDRESS | TIME STAMP | DATA | CRC |
|---|---|---|---|---|---|---|---|---|---|---|---|
| • | | 01100100 | 60 | 0 | | 1 | | | 2 | | |

PACKET SWITCHING NETWORK WITH MULTIPLE PACKET DESTINATIONS

TECHNICAL FIELD

This invention relates to apparatus and a method for the communication of packets through a self-routing packet switching network. The invention pertains to a switching network responsive to routing information contained within packets for communicating them to single or multiple destination ports on that network.

BACKGROUND OF THE INVENTION

The advantages of using a network comprising switching elements that route packets of data through the network on the basis of an address contained within the packets are known. Such networks are commonly called binary routing networks. A specific example is the butterfly or banyan network. In such a network, there exists only one unique path between any two network terminations. The network comprises a plurality of stages each having a number of switch nodes. The stages are interconnected by means of links. Each switch node, upon receipt of a packet, is responsive to the contents of its address field to properly route the packet to the next stage via an interconnecting link.

One system of that type is disclosed in J. S. Turner, U.S. Pat. No. 4,491,945, of Jan. 1, 1985, entitled "Fast Packet Switch". The Turner system is designed to provide integrated voice and data packet communication among a plurality of packet switching networks interconnected by means of digital trunks with each such trunk being terminated by a trunk controller which interconnects to a packet switching network. The patent describes call setup and reply packets used by customers to set up a logical path through the different packet switching networks. The system works using two different types of packets for the communication of data. Trunk packets are utilized for the transmission of information on high-speed digital trunks, and the transfer of information between trunk controllers through a packet switching network is via switch packets which comprise the trunk packet plus additional information used for routing the packet through the packet switching network. A trunk controller is responsive to a trunk packet to form the switch packet and, in particular, to insert into a destination trunk controller field of the switch packet the address used to route the packet through the packet switching network. As the switch packet is routed through the packet switching network, each node, upon receiving the switch packet, examines the destination trunk controller field and communicates the packet to the destinated switch node in a next subsequent stage. Each switch packet communicated from an originating trunk controller is only transmitted to one destination trunk controller.

Whereas the process of allowing each switch packet to be transmitted to only one destination trunk controller gives adequate performance in many situations, there are situations where it is desirable that a packet transmitted from one trunk controller be received by a plurality of destination trunk controllers. For example, in the Turner system, the central processor performing administrative control of the switching network communicates with the various trunk controllers attached to that network via its own trunk controller. Situations arise where it is desirable for the central processor to be able to transmit the same packet to a group of destination trunk controllers or two individual trunk controllers. One such situation is when a conference call function is being performed by the network. In addition, during certain types of maintenance functions, it is desirable to be able to transmit the same packet to all trunk controllers attached to the switching network. In the Turner system, the central processor transmits such packets one at a time to each of the destination trunk controllers. Obviously, such techniques involve large amounts of real time to do so.

Self-routing networks are often used for the interconnection of a plurality of computers, but such networks suffer from the disadvantage that they are unable to transmit a given packet simultaneously rather than in sequence to a number of computers attached to the network. For example, one such simultaneous transmission case is where one computer is transferring a data base to a number of other computers.

SUMMARY OF THE INVENTION

In an illustrative method and structural embodiment, a departure in the art is achieved by a switch node within a network switching stage utilizing routing information within a packet to communicate the packet to a single downstream node or a plurality of downstream nodes and to modify the routing information of the packet communicated to the plurality of downstream nodes so that the packet can be communicated to a plurality of distinct destinations.

The structural embodiment comprises a multistage packet switching network having a plurality of stages, each comprising a plurality of switch nodes. Each packet contains routing information which is made up of a plurality of sets of signals. Each set is utilized by an individual stage of the network to route the packet there through. If the most significant set of the route information of a received packet contains a first type of signals indicating a single-destination packet, the receiving node is responsive to the packet to route the packet to a node of the next sequential stage designated by the contents of the most significant set of routing information. If the most significant set of routing information contains a second type of signals indicating a broadcast packet, the receiving node is responsive to this second type of signal to route the packet to a plurality of switch nodes in the next sequential stage. Finally, if the most significant set contains a third type of signals indicating a split-destination packet, the receiving node is responsive to this type of packet to first modify the routing information contained in the next lesser significant set of routing information of the packet and, then, to use the modified routing information to form a plurality of single destination packet each having different modified routing information and to route these packets to individual switch nodes of the next sequential stage.

Advantageously, each node has two output terminals connected to the next sequential stage. Each set of signals contains a pair of signals, and the first type of signals is indicated by the most significant set having either a first or a second predefined value. The first type of signals indicates a single-destination packet. If the set contains the first predefined value, then the packet is communicated to the first output terminal, but if the packet contains the second predefined value, the packet is communicated to the second output terminal. In this manner, a single-destination packet is routed through the switching network. The second type of signals which are indicative of a broadcast packet, occur when the pair of signals contain a third predefined value.

Advantageously, the split-destination packet is indicated by the pair of the most significant set containing a fourth predefined value, and the switch node is responsive to the fourth predefined value to examine the most significant signal of the next pair of lesser significant sets for modifying the route information to form new single-destination packets. The new route address is formed by inserting said first predefined value into the corresponding set position of the new packet being communicated to the first terminal upon the most significant signal being a fifth predefined value and inserting the second predefined value into the corresponding set position upon the most significant signal being a sixth predefined value. In addition, the node forms the single-destination packet communicated to the second output terminal in a similar fashion by interrogating the least significant signal of the next set.

The illustrative method functions with a switching network having a plurality of stages each having a plurality of switch nodes. Packets comprising sets of route information signals are switched through the switching network via the switch nodes. The method includes the steps of communicating a packet from a switch node in one switching stage to a plurality of switch nodes in the next sequential stage when the most significant set of route signals indicates a broadcast type packet, modifying the next set of route signals if the most significant set of route signals indicates a split-destination packet to form modified packets which are single-destination packets, and transferring each of the modified packets to individual switch nodes of the next sequential stage.

Advantageously, each of the switch nodes has two output terminals connected to the next sequential stage and each set of route signals comprises two signals. With respect to single-destination packets, if the most significant set of signals has a first predefined value, the node transmits the packet to the next sequential stage via a first output terminal; and if the most significant set of route signals has a second predefined value, the node communicates the packet to the second output terminal.

In addition, split-destination packets are formed into two single-destination packets by first examining the most significant signal of the next set of route signals to determine the route signals inserted into this next set for the single-destination packet that is routed to the first output terminal and examining the least significant signal of the next set to determine the signals inserted into that set of route signals for the single-destination packet to be routed to the second output terminal of the node.

BRIEF DESCRIPTION OF THE DRAWING

In general, system elements, when first introduced on a FIGURE, are each designated with a number that uses the FIGURE number as the most significant digits of the element number.

FIGS. 3 through 15 illustrate packet formats for use with the present invention;

DETAILED DESCRIPTION

Figure 1:
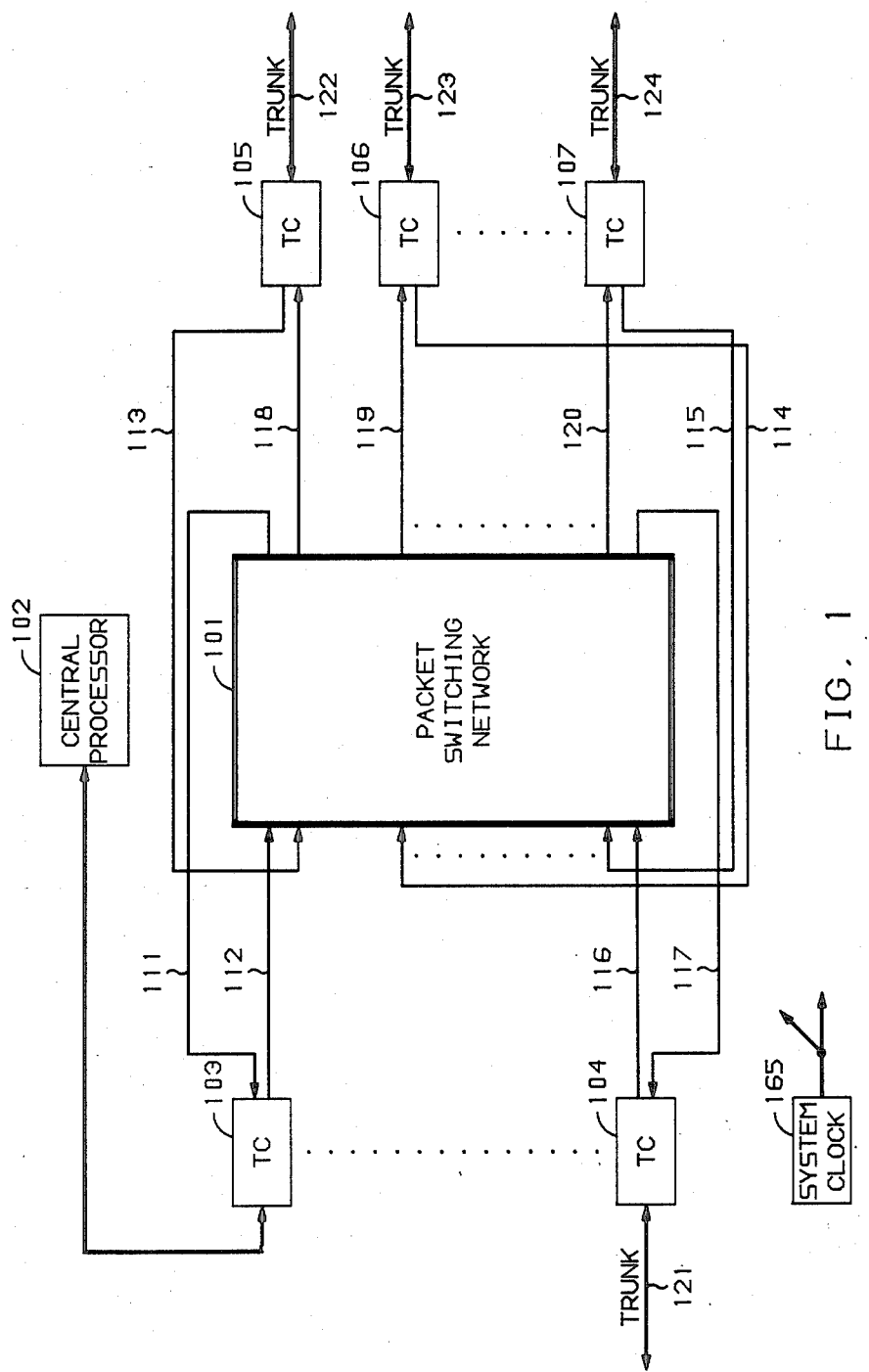
FIG. 1 is a block diagram of a packet switching system having a packet switching network in accordance with the invention depicted in heavy line block diagram form.

FIG. 1 illustrates a packet switching system for switching packets from an originating trunk controller such as trunk controller 104 to a single trunk controller such as trunk controller 105, to a group of trunk controllers such as trunk controllers 106 to 107, or to two distributed destination trunk controllers such as 107 and 105. Packet switching network 101 comprises a plurality of switching stages which illustratively may be four, and each switching stage comprises a plurality of switch nodes. Packet switching network 101 is illustrated in greater detail in FIG. 2. An illustrative switch packet is shown in FIG. 3, which contains in its destination trunk controller field the routing information necessary to route the packet through packet switching network 101 as illustrated in FIG. 2.

Figure 2:
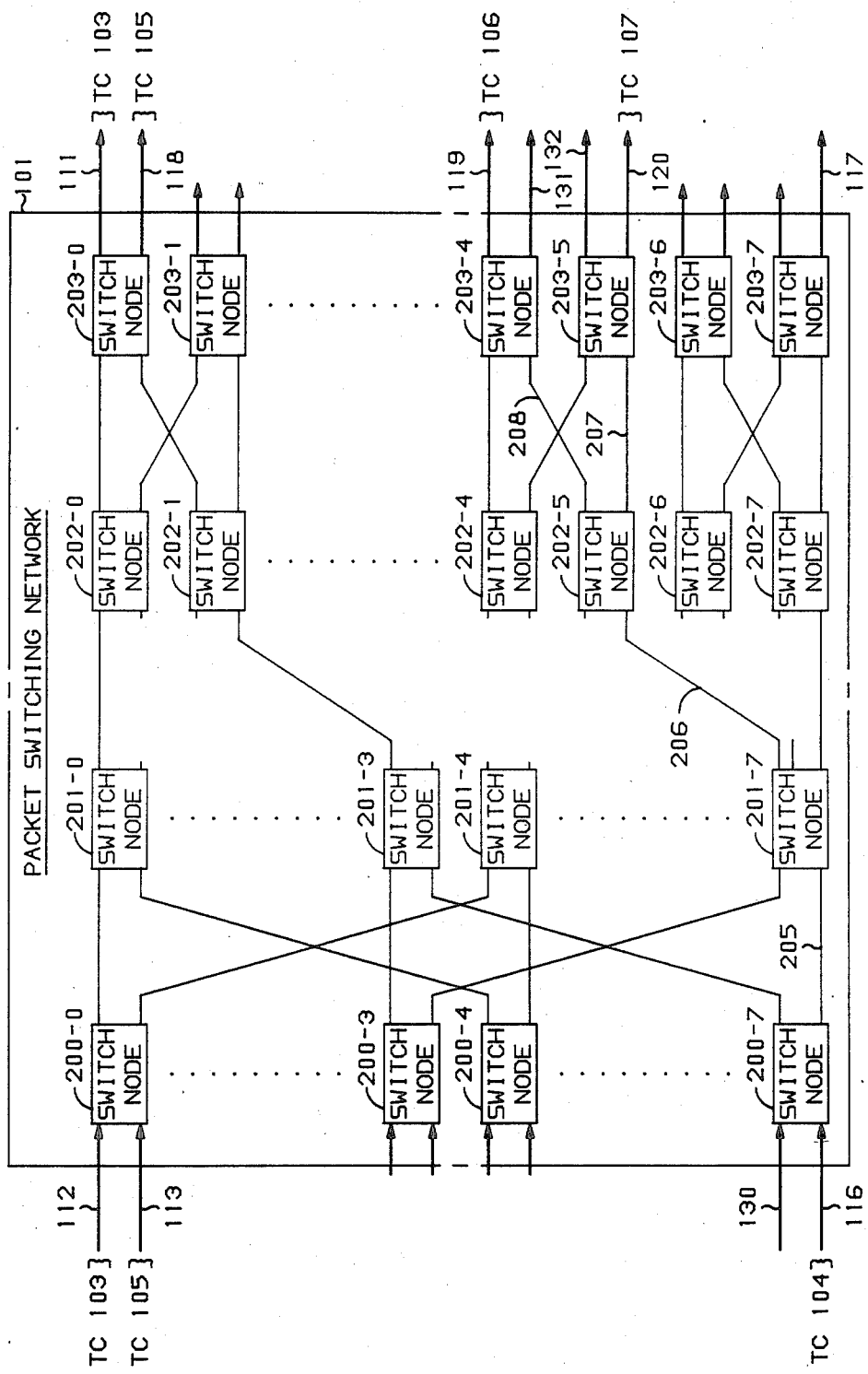
FIG. 2 is a block diagram of a packet switching network utilizing the switch node of this invention.

Each node in FIG. 2 is responsive to a packet received on an input link to communicate this packet on the basis of the contents of the destination trunk controller field to the designated output link. Each node is responsive to the two most significant bits of the destination trunk controller field to make this routing determination and before communicating the packet on the outgoing link, the switch node performs a left rotation on the destination trunk controller field so that the most significant bits become the least significant bits. The two most significant bits are used to control the routing in the following way. If the most significant bits of the destination trunk controller field are a "01", the packet is directed to the upper output link; if the most significants bits are a "10", the packet is directed to the lower output link; if the most significant bits are a "11", the packet is simultaneously directed to both the upper and lower paths; and, if the most significant bits are a "00", the packet is directed to both the upper and the lower path, however, the destination trunk field is modified so that different addresses in the latter field are set out on the two output links.

Figures 6, 7, 8:
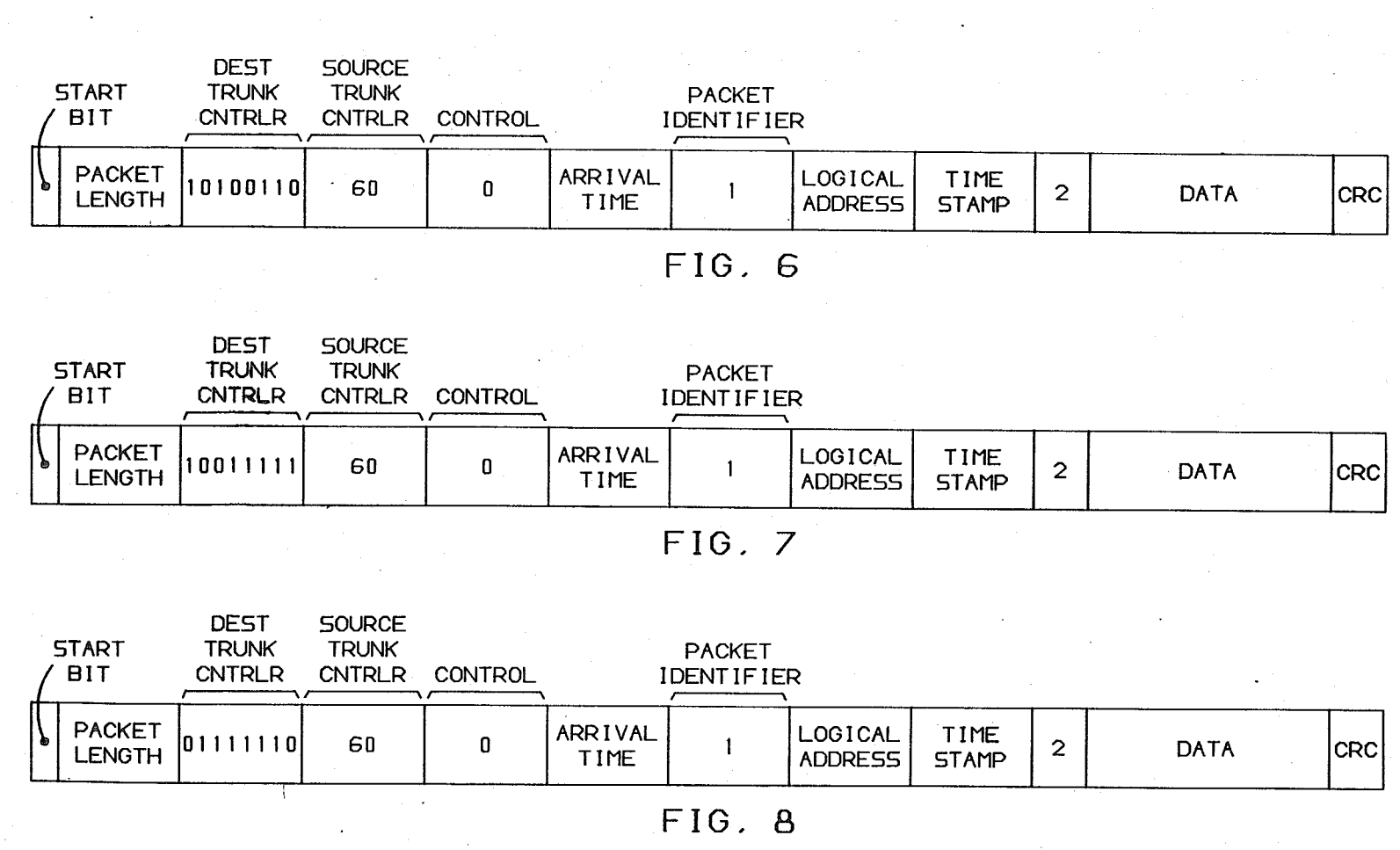

The operation of switching network 101, as illustrated in FIG. 2, can be better understood by considering the examples of switching the packets illustrated in FIGS. 3, 7, and 11 from trunk controller 104 through switching network 101. The packet illustrated in FIG. 3, is communicated from trunk controller 104 to trunk controller 107; the packet illustrated in FIG. 7 is communicated to four trunk controllers, trunk controllers 106 through 107, connected to the four output links of nodes 203-4 and 203-5; and the packet illustrated in FIG. 11 is communicated from trunk controller 104 to the trunk controllers connected to output links 131 and 120 of FIG. 2. First, consider the communication of the packet illustrated in FIG. 3 from trunk controller 104 to trunk controller 107. Node 200-7 is responsive to the packet illustrated in FIG. 3 being received from input link 116 to interrogate the two most significant bits of the destination trunk controller field. Since the two most significant bits are a "10", node 200-7 communicates this packet to node 201-7 via output link 205. Before communicating the packet to node 201-7, node 200-7 performs a left rotation on the destination trunk controller field resulting in the field illustrated in FIG.

4. Node 201-7 is responsive to the packet illustrated in FIG. 4 to communicate this packet to node 202-5 via output link 206 since the most significant bits of the packet illustrated in FIG. 4 are a "01" which designates that the packet be communicated via the upper output link of node 201-7. Node 202-5 is responsive to the packet illustrated in FIG. 5 to communicate this packet to node 203-5 via output link 207 since the most significant bits of the destination controller field are a "10". Before transmission of the packet illustrated in FIG. 5 to node 203-5, node 202-5 rotates the destination trunk controller field resulting in the field illustrated in FIG. 6. Node 203-5 is responsive to the packet illustrated in FIG. 6 to communicate this packet to trunk controller 107 via output link 120 since the most significant bits of the destination trunk controller field are a "10".

The second example is the communication of the packet illustrated in FIG. 7 to the four trunk controllers connected to output links 119, 131, 132, and 120 of nodes 203-4 and 203-5, respectively. Nodes 200-7 and 201-7 are responsive to the packets illustrated in FIGS. 7 and 8, respectively, to route the packet to node 202-5 in the same manner as the packet of FIG. 3 was routed to node 202-5. FIG. 9 illustrates the packet upon its receipt by switch node 202-5. Since the most significant bits are a "11", node 202-5 is responsive to the packet illustrated in FIG. 9 to communicate this packet to nodes 203-4 and 203-5 via output links 208 and 207, respectively. The packets received by nodes 203-4 and 203-5 are illustrated in FIG. 10. Since the two most significant bits of the destination controller field are a "11", node 203-4 transmits this packet on both links 119 and 131 and node 203-5 transmits this packet on links 132 and 120.

Finally, consider the communication of the packet illustrated in FIG. 11 to trunk controllers 106 and 107. The packets illustrated in FIGS. 11 and 12 are communicated via nodes 200-7 and 201-7, respectively, to node 202-5 in the same manner as the packets illustrated in FIGS. 3 and 4. Upon receiving the packet illustrated in FIG. 13, node 202-5 is responsive to the most significant bits of the destination trunk controller field being "00" to transmit the packet illustrated in FIG. 14 to node 203-5 and the packet illustrated in FIG. 15 to node 203-4. Node 203-5 is responsive to the packet illustrated in FIG. 14 to communicate this packet to trunk controller 107 via link 120, and node 203-4 is responsive to the packet illustrated in FIG. 15 to communicate this packet to the trunk controller connected to output link 131. The operations performed by node 202-5 to assemble the packets illustrated in FIGS. 14 and 15 are now described.

Upon receiving the packet illustrated in FIG. 13, node 202-5 is responsive to the most significant bits being "00" to consider the next pair of less significant bits of the destination trunk controller field in the following manner. The remaining pairs of least significant bits are not interrogated are unaltered. The most significant bit of the next pair defines the address that is transmitted via the lower output of 202-5 via link 207 and the least significant bit of the pair determines the contents of the destination trunk controller field that is transmitted via the upper output of node 202-5 via link 208. These bits of the next pair determine the address of the resulting packets as follows. If the bit is a "0" then a "01" is inserted into the new destination trunk controller field and if the bit is a "1", then a "10" is inserted into the new destination trunk controller field. Before transmitting the newly formed packets, node 203-5 performs a 2-bit left rotation operation so that the bits "00" occupy the least significant bit positions of the destination trunk controller fields illustrated in FIGS. 14 and 15.

Figure 16:
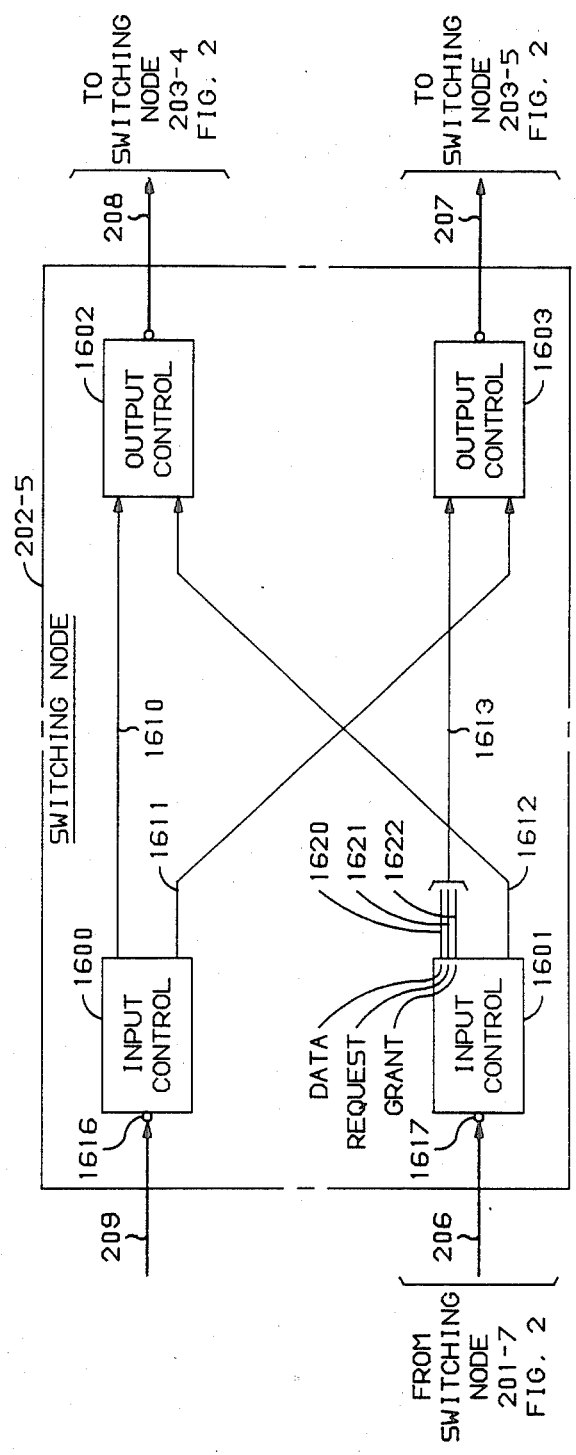
FIG. 16 illustrates a detailed block diagram of switch node 202-5 of FIG. 2.

Switch node 202-5 is illustrated in greater detail in FIG. 16. The other switch nodes are similar in design to switch node 202-5. The switch node consists of two input controls that can transmit information to any one of two output controls. The input controls 1600 and 1601 are connected to the output controls 1602 and 1603 via cables. For example, input control 1601 is connected to output control 1603 via cable 1613. Cable 1613 comprises three conductors, 1620, 1621, and 1622. The other interconnecting cables in FIG. 16 are identical in design to cable 1613.

Upon receipt of packet illustrated in FIG. 5, input control 1601 transmits to output control 1603 a request signal via conductor 1621. Even after receiving a grant signal from output control 1603, input control 1601 continuously transmits this request signal until the entire packet has been transmitted to output control 1603. When output control 1603 is free to receive information from input control 1601, output control 1603 transmits the grant signal via conductor 1622 to input control 1601. Upon receipt of the grant signal, input control 1601 commences to transmit the packet to output control 1603 via conductor 1620.

Now, assuming a packet of the type illustrated either in FIG. 9 or FIG. 13, input control 1601 transmits request signals to output controls 1602 and 1603 and waits until a grant signal is received back from each of those output controls before commencing transmission of the packet to both of the output controls simultaneously over the appropriate cables. If the packet is of the type illustrated in FIG. 13, input control 1601 inserts the new routing information into the trunk destination field of each packet before transmission to the appropriate output control.

For example, the packet illustrated in FIG. 5 is transmitted through switch node 202-5, as illustrated in FIG. 16, in the following manner. When input control 1601 recognizes the start bit, it has already received not only the start bit, but also the destination trunk controller field. Input control 1601 decodes the two most significant bits of the destination trunk controller field and determines that the packet is to be transmitted to output control 1603 via cable 1613. Input control 1601 requests permission to start transmission via cable 1613; and when output control 1603 returns the grant signal via cable 1613, input control 1601 starts the transmission of the packet to output control 1603 via cable 1613. Before transmitting the destination trunk controller field, input control 1601 performs a left rotation of this field so that the contents of the destination trunk controller field are those shown in FIG. 6. Upon receipt of the start bit of the packet, output control 1603 starts to transmit this packet via link 207 to switch node 203-5.

Figure 17:
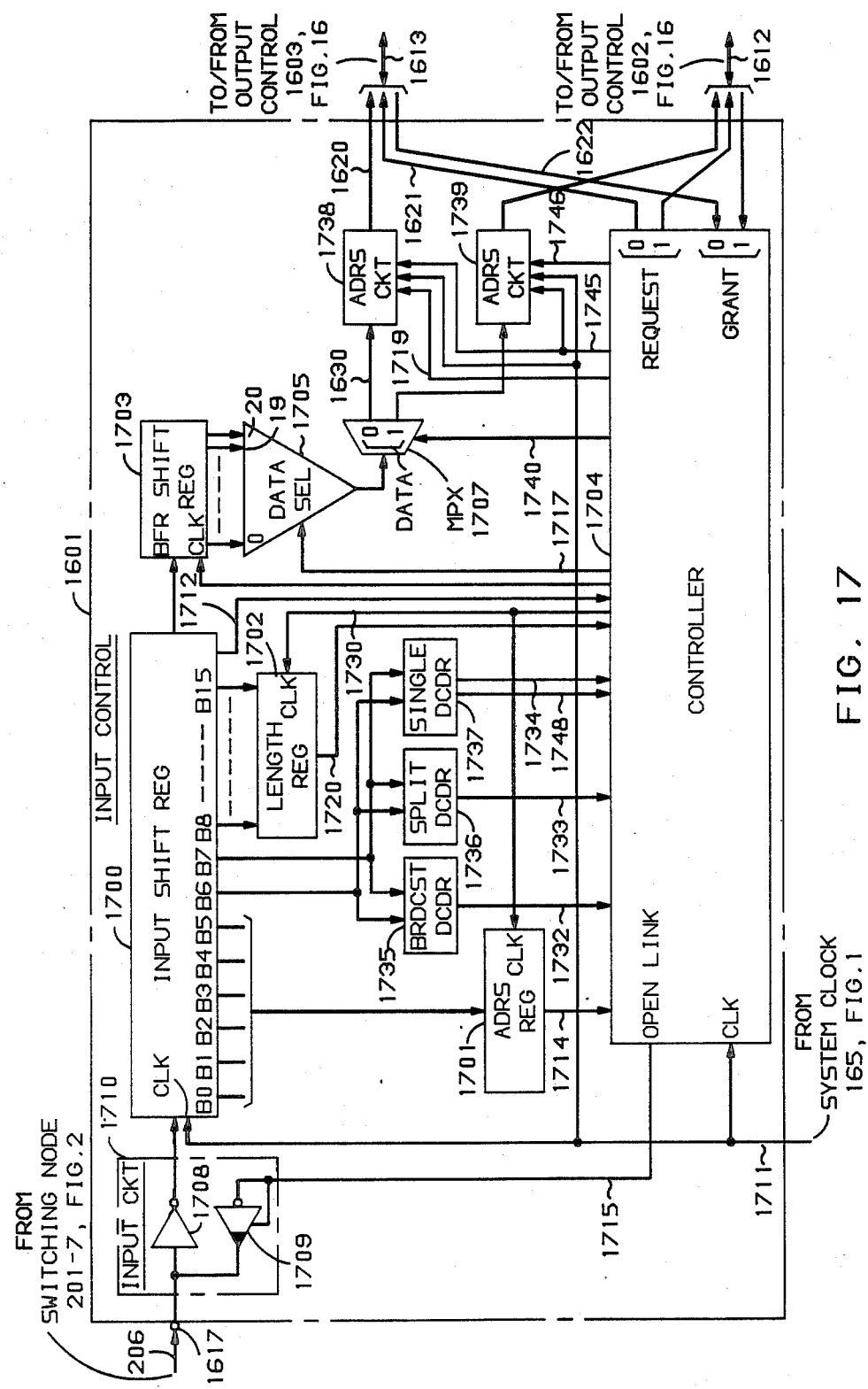
FIG. 17 is a detailed block diagram of input control 1601 of switch node 202-5 of FIG. 16.

Input control 1601 is shown in greater detail in FIG. 17. Input circuit 1710 receives the information from input terminal 1617 from node 201-7 via link 206 the link-open signal under control of controller 1704. The function of the link-open signal is explained in greater detail with respect to the discussion of FIG. 19. Input shift register 1700 is used to detect the start bit that indicates the beginning of the packet. In addition, input shift register 1700 is used to extract the network packet length field, which is saved in length register 1702. The first two bits of the destination trunk controller field are decoded by elements 1735, 1736 and 1737 to determine the type of address operation that is to be performed, and the results of that decoding is transmitted to controller 1704 via conductors 1732, 1733 and 1734 and 1748, respectively. The remainder of destination trunk controller field is stored in address register 1701.

Buffer shift register 1703 is capable of buffering one complete packet. Buffer shift register 1703 provides an output after each 64 bits of storage. These outputs are selected by data selector 1705 under control of controller 1704, to bypass unused portions of the buffer shift register 1703. This bypassing is done when it is not necessary to buffer a whole packet before transmission of a packet can start to the output circuit and is done to speed up the transfer of a packet through input control 1601. Address circuits 1738 and 1739 perform the left rotation of the destination trunk controller field and where the packet is of the type illustrated in FIG. 14, generate the new trunk controller destination field information.

The operation of input control 1601 will now be further explained by using the previous example which dealt with the transmission of the packet shown in FIG. 13. Input shift register 1700 is continuously being clocked by the system clock 161 via conductor 1711. As data is received via input terminal 1617, it is clocked through input shift register 1700. Once the start bit reaches bit position 15 of input register 1700, controller 1704 detects this bit and transmits a signal via conductor 1713. The other six bits of the trunk controller destination field and the length field are stored in address register 1701 and length register 1702, respectively, in response to the transmission of the signal on conductor 1713. Since the two most significant bits of the destination controller field are "00", that fact is decoded by decoder 1736 which transmits a signal to controller 1704 via conductor 1733. The latter controller is responsive to that signal to transmit requests to output controls 1602 and 1603 via cables 1612 and 1613, respectively. While these requests are being made, data is being shifted from the input shift register 1700 to buffer shift register 1703 that has a number of output terminals. These output terminals are connected to different bit positions within buffer shift register 1703. When controller 1704 has received grant signals from both output controllers, controller 1704 calculates at which output of the buffer shift register 1703, the start bit of the packet is approaching within buffer register 1703. This is done so that the transmission of the packet to the output controllers can start as soon as possible. On the basis of this calculation, controller 1704 controls data selector 1705 to select the designated output of buffer shift register 1703. The control information is transmitted to data selector 1705 via cable 1717. Data selector 1705 transmits the data from the selected output of buffer shift register 1703 to multiplexer 1707. Controller 1704 conditions multiplexer 1707 via cable 1740 to transmit the information received from data selector 1705 to address circuits 1738 and 1739. When address circuits 1738 and 1739 are receiving the first bit of the destination trunk controller field, controller 1704 transmits a signal via conductor 1745 to both address circuits 1738 and 1739 indicating that fact. Address circuit 1738 is responsive to the destination trunk controller field of FIG. 13 to generate the destination trunk controller field illustrated in FIG. 15, and address circuit 1739 is responsive to the signal on conductor 1745 and the destination trunk controller field of FIG. 13, to generate the destination trunk controller field illustrated in the packet of FIG. 14.

Input control 1601 responds similarly to the packet illustrated in FIG. 5 with the following exceptions. Decoder 1737 is responsive to the two most significant address bits being a "10" to transmit a signal to controller 1704 via conductor 1734. The latter controller is responsive to that signal to condition multiplexer 1707 to direct the output of data selector 1705 to address circuit 1739. In addition, controller 1704 in response to the signal on conductor 1734 only transmits a request signal to output control 1603. In addition, when the most significant bit of the destination trunk controller field is arriving at address circuit 1739, controller 1704 transmits a signal via conductor 1746 to address circuit 1739. The latter circuit is responsive to the signal on conductor 1746 to perform the left rotation of the destination trunk controller field resulting in the field illustrated in FIG. 6.

If the two most significant address bits are a "01", decoder 1737 transmits a signal via conductor 1748 to controller 1704. The latter controller would be responsible to that signal to condition multiplexer 1707 to direct the output of data selector 1705 to address circuit 1738. In addition, controller 1704 in response to the signal on conductor 1748 would only transmit a request signal to output controller 1602. In addition, when the most significant bit of the destination trunk controller field would be arriving at address circuit 1738, controller 1704 would transmit a signal via conductor 1719 to address circuit 1738. The latter circuit would be responsive to the signal on conductor 1719 to perform a left rotation of the destination trunk controller field.

Input control 1601 is responsive to the packet illustrated in FIG. 9 in the same manner as the packet illustrated in FIG. 5 with the following exception. Decoder 1735 is responsive to the two most significant bits of the destination trunk controller field being a "11" to transmit a signal to controller 1704 via conductor 1732. The latter controller is responsive to that signal to control multiplexer 1707 such that the information from data selector 1705 is transmitted to both address circuits 1738 and 1739. Also, when controller 1704 transmits the signal via conductor 1746, it also transmits a signal to address circuit 1738 via conductor 1719. Address circuit 1738 responds to the signal on conductor 1719 in the same manner as address circuit 1739 responds to the signal transmitted via conductor 1746.

Figure 18:
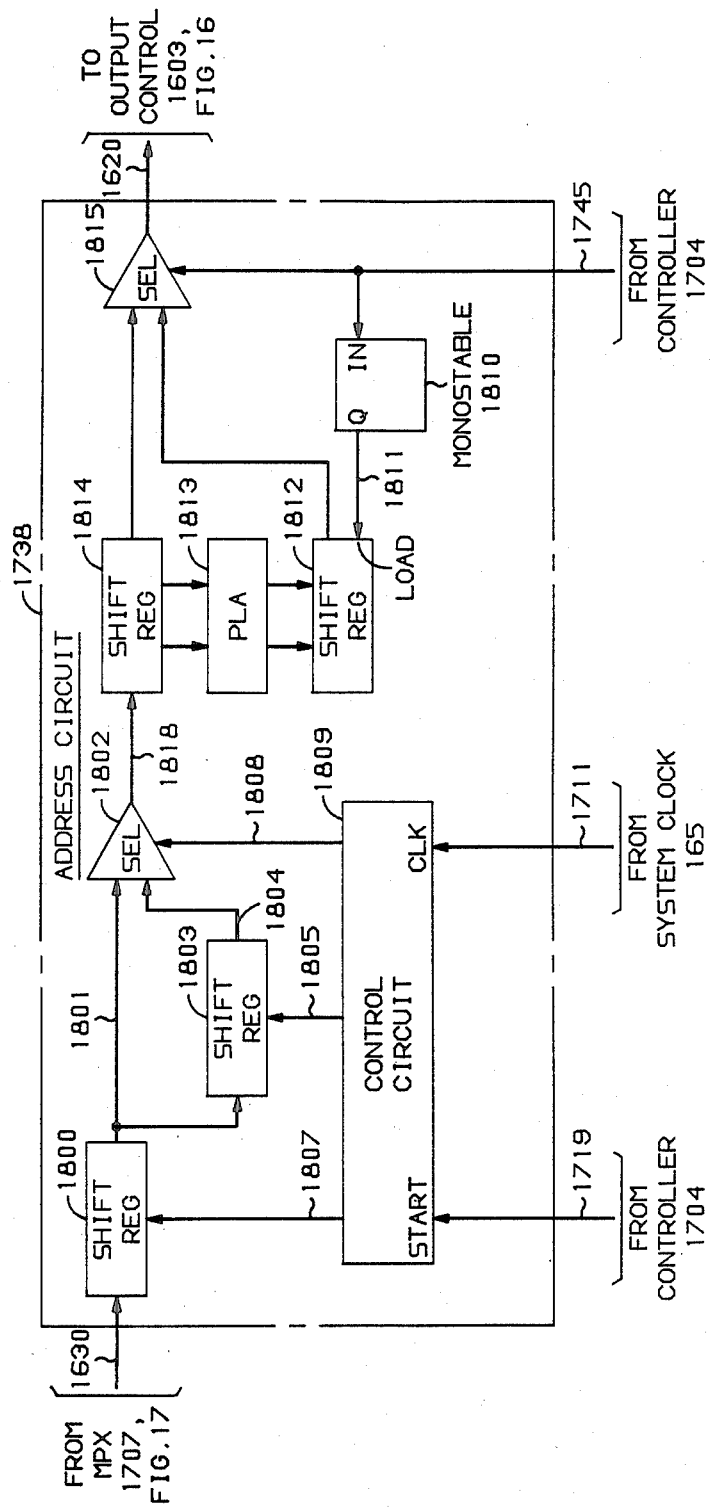
FIG. 18 is a detailed block diagram of address circuit 1738 of input control 1601 of FIG. 17.

Address circuit 1738 is illustrated in greater detail in FIG. 18. Circuit 1738 performs two functions. The first function is to rotate the address contained in the destination trunk controller field to the left by 2 bits so that the most significant bits become the two least significant bits. The rotation is necessary because each input control decodes only the two most significant bits. The second function is to update the address in the destination trunk controller field upon the most significant bits being "00" that indicates that a split-destination packet which is to be transmitted to two different destinations and the address must be modified. The address rotation is performed by elements 1800 through 1809. Shift registers 1800 and 1803 are 2-bit shift registers, data selector 1802 is used to select either the output of shift register 1800 or shift register 1803 and control circuit 1809 controls the operation of the address rotation function. When control circuit 1809 receives the start of address field signal from controller 1704 via conductor 1719, it transmits a clock signal to shift register 1800 via conductor 1807, and to shift register 1803 via conductor 1805. This clock signal is derived from the signal received from system clock 16 via conductor 1711. Control circuit 1809 conditions data selector 1802 via conductor 1808 to select shift register 1803's output to be transmitted on conductor 1818. Control circuit 1809 then counts the number of bits that are being transmitted via conductor 1718; when the most significant 2 bits of the destination trunk controller field are contained within shift register 1803, control circuit 1809 ceases to transmit the clock signal to shift register 1803 via conductor 1805, and conditions data selector 1802 to select the output of shift register 1800. Control circuit 1809 then waits until the remaining bits of the destination trunk controller field have been transmitted via conductor 1630. At this point in time, control circuit 1809 commences to send clock signals to shift register 1803 and conditions data selector 1802 to select the output of shift register 1803. This operation results in the two most significant bits of the address field being rotated.

The function of generating a new address for the destination trunk controller field is performed by elements 1810 through 1815. The generation of the new address for a split-destination packet is controlled by the next pair of bits after the most significant pair of bits of the destination trunk controller field. When the next pair of bits is present in shift register 1814, programmed logic array (PLA) 1813 compliments the contents of shift register 1814 and transmits the complimented contents of shift register 1814 to shift register 1812. When the next pair of bits is present in shift register 1814, controller 1704 transmits a signal via conductor 1745. In response to that signal, monostable 1810 transmits a pulse on conductor 1811. Shift register 1812 is responsive to the pulse on conductor 1811 to store the output of PLA 1813 internally. The signal on conductor 1745 also conditions data selector 1815 to select the output of shift register 1812 for transmission on conductor 1620 to output control 1603. After 2 bits have been transmitted from shift register 1812, controller 1704 ceases to transmit the signal on conductor 1745 resulting in data selector 1815 once again selecting the output of shift register 1814 for transmission on conductor 1620. The remaining pairs of bits of the trunk controller destination field are unmodified.

Address circuit 1739 is similar in design to address circuit 1738 but the PLA equivalent to PLA 1813 in address circuit 1739 does not compliment the output of shift register 1814, but rather passes these bits unmodified to shift register 1812.

Figure 19:
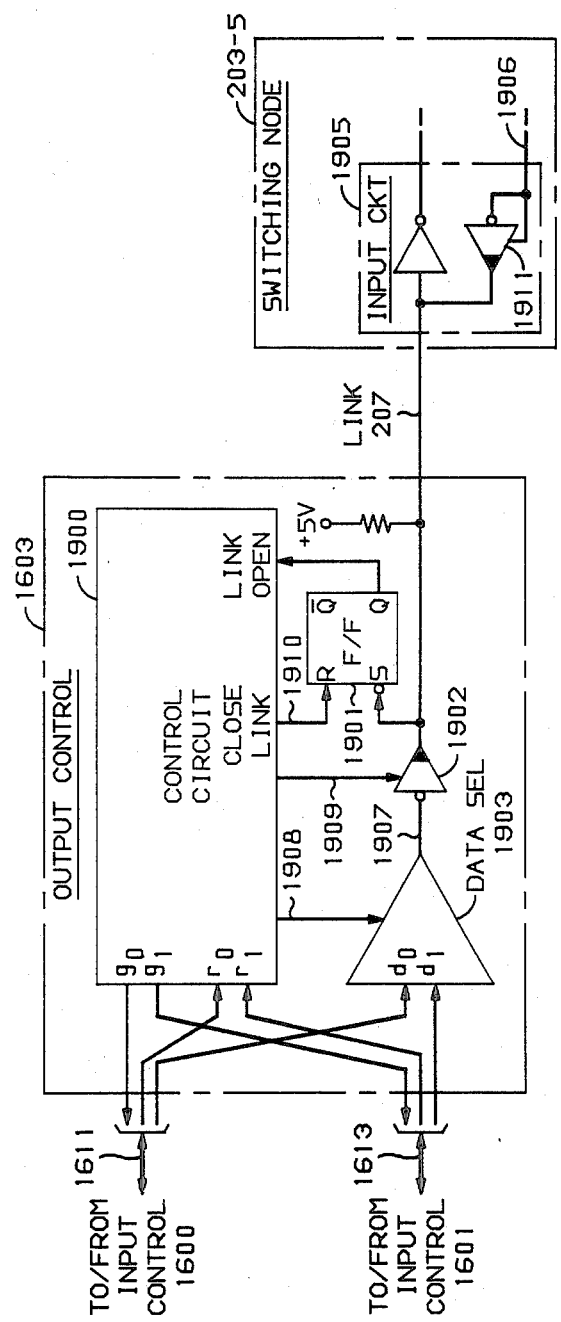
FIG. 19 is a detailed block diagram of output control 1603 of node 202-5 of FIG. 16.

Output control 1603 is shown in greater detail in FIG. 19. Control circuit 1900 responds to requests from input controls 1600 and 1601, which are transmitted via cables 1611 and 1613. If flip-flop 1901 is set, control circuit 1900 responds to the request by transmitting a grant signal back to the requesting input control via one of the above-mentioned cables. After acknowledging the request, control circuit 1900 conditions data selector 1903 to select the data conductor from the appropriate cable 1611 or 1613. Control circuit 1900 transmits the appropriate control information to data selector 1903 via cable 1908. Data selector 1903 transfers the data information received on the selected input terminal to conductor 1907. Tri-state device 1902 takes the information on conductor 1907 and transmits this data via link 207 to input circuit 1905, which is part of node 203-5. Control circuit 1900 controls the output of tri-state device 1902 via conductor 1909.

The operation of output control 1603, as shown in FIG. 19, will be explained in greater detail by considering the example of input control 1601 transmitting the packet of data to output control 1603 via cable 1613. When input control 1601 transmits the request signal via conductor 1613, control circuit 1900 transmits the grant signal to input control 1601 via conductor 1613 if the link is not being used by one of the other input control circuits, and the output flip-flop 1901 is set. Assuming that flip-flop 1901 is set, control circuit 1900 transmits the grant signal to input control 1601 and conditions data selector 1903 via cable 1908 to select the data being transmitted on conductor 1613 and retransmits this data on conductor 1907. In addition, control circuit 1900 enables the tri-state device 1902 to transfer the information on conductor 1907 to link 207.

It is to be understood that the above-described embodiment is merely illustrative of the principles of the invention and that other arrangements may be devised by those skilled in the art without departing from the spirit and the scope of the invention. In particular, it would be obvious to one skilled in the art to modify the disclosed structural embodiment such that when a switch node detected a split-destination packet, the switch node not only modified the next significant pair of routing bits, as previously described, but also all remaining least significant pairs of routing bits in a manner similar to that described for the next significant pair. In addition, it would also be apparent to one skilled in the art to use other methods of determining which pair of routing bits are utilized by a particular node in performing the routing function.

What is claimed is:

1. A multi-stage packet switching network for switching packets each comprising routing information, said network having switching stages each comprising a plurality of switch nodes, comprising:
   said information comprises sets of signals in ordered significance with each set defining the routing through one of said stages of said network;
   each of said nodes comprising means to decode a first type of said signals in the most significant set of said signals of a received packet for communicating said received packet to a switch node of a next sequential one of said stages;
   said communicating means comprises means responsive to a second type of said signals in said most significant signal set for communicating said packet to a plurality of said nodes in said next sequential stage; and
   means responsive to a third type of signals in said most significant signal set for modifying said route information to communicate said packet to a plurality of said switch nodes in said next sequential stage upon modifying said routing information as defined by said most significant signal set.

2. The network of claim 1 wherein each of said switch nodes further comprises means for repositioning said most significant set of signals in said routing information to the least significant position of said routing information and a lesser significant set of said routing information to the most significant set position.

3. The network of claim 4 wherein each of said nodes further comprises a first and second output terminals connected to said next sequential stage and each of said sets of signals comprises a pair of signals and said first type of signals being indicated by the pair of said most significant set having a first and a second predefined value;

said communicating means comprising means responsive to said pair of said most significant set having said first predefined value to communicate said packet to said first output terminal; and said communicating means further comprising means responsive to said pair of said most significant set having said second predefined value to communicate said packet to said second output terminal.

4. The network of claim 3 wherein said third type of signals indicated by said pair of said most significant set having a third predefined value;

said modifying means comprises means for examining the most significant signal of the next pair of lesser significant sets than said most significant set to insert said first predefined value into the corresponding set position of the new packet being communicated to said first output terminal upon said most significant signal of said corresponding lesser significant set being a fourth predefined value and said second predefined value upon said most significant signal being a fifth predefined value; and said modifying means further comprises means for examining the least significant signal of said next pair of lesser significant sets than said most significant set to insert said first predefined value into the corresponding set position of the new packet being communicated to said second output terminal upon said least significant signal of said most significant set being said fourth predefined value and said second predefined value upon said least significant signal equaling said fifth predefined value.

5. The network of claim 4 wherein said fourth predefined value is equal to a "0" and said fifth predefined value is equal to a "1".

6. A switch node for switching packets each of which has sets of route address information individually defining the destination from said node and said switch node connectible to a plurality of input and output links, comprising:

a plurality of input control means each connected to one of said input links;

a plurality of output control means each connected to one of said output links;

a plurality of intra-links connecting each of said input control means to an individual one of said output control means;

said packets being broadcast, split-destination and single-destination packets;

each of said input control means comprising means responsive to a receipt of one of said broadcast packets for routing said one of said broadcast packets to all of said output control means via said intra-links;

means responsive to a receipt of one of said split-destination packets for generating a first and second single-destination packets from said one of said split-destiniation packets with said first and second single-destination packets each having different route address information; and means responsive to said first and second single-destination packets for routing each of said single-destination packets to an individual one of said output control means via said intra-links.

7. The switch node of claim 6 wherein said sets of route address information each comprise two address signals and the broadcast routing means comprises means responsive to the most significant set of said route address information being a first predefined value for determining that one of said packets is said one of said broadcast packets; and said split-destination generating means responsive to said most significant set being a second predetermined value for determining that one of said packets is said one of said split-destination packets.

8. The switch node of claim 7 further comprises means for repositioning said most significant set in said route address information to the least significant position of said route address information and a lesser significant set of said route address information to the most significant position.

9. The switch node of claim 11 wherein said sets of routing information each comprises a pair of signals said split-destination generating means comprises means responsive to said most significant set being said second predetermined value indicating a split-destination packet for examining the most significant signal of next set of said route address information than said most significant set to insert a third predefined value into the corresponding set position of said first single-destination packet upon said most significant signal of said most significant set being a fifth predefined value and a fourth predetermined value upon said most significant signal of said most significant set being a sixth predefined value; and said split-destination generating means further comprises means for examining the least significant signal of said next lesser significant sets of said route address information than said most significant set to insert said third defined value into the corresponding set position of said second single-destination packet upon said least significant signal of said next lesser significant set equaling said fifth predefined value and said fourth predefined value upon said least significant signal of said next lesser significant set equaling said sixth predefined value.

10. The switch node of claim 9 wherein said fifth predefined value is equal to a "0" and said sixth predefined value is equal to a "1".

11. A method of routing packets comprising broadcast and split-destination and single-destination packets through a switch node in response to a route address in each of said packets, said node comprising a plurality of input control means each connected to one of a plurality of input links, a plurality of output control means each connected to one of a plurality of output links, intra-links connecting each of said input control means to an individual one of said output control means and each route address comprising a plurality of sets of routing signals each capable of defining said broadcast, split-destination and single-destination packets, comprising the steps of:

routing one of said broadcast packets to a plurality of said output control means with said one of said broadcast packets being identified by one of said sets of said routing signals being a first predefined value;

generating a plurality of secondary route addresses in response to one of said split-destination packets with the latter being identified by said one of said sets of said routing signals being a second predefined value;

forming a plurality of single-destination packets in response to said secondary addresses and said one of said split-destination packets; and communicating each of said plurality of single-destination packets to an individual one of said plurality of said output control means.

12. The method of claim 11 further comprising the step of transmitting each of said plurality of single-destination packets by said individual ones of said output control means via corresponding ones of said plurality of output links.

13. The method of claim 11 wherein said one of said sets of routing signals is the most significant set and said step of communicating further comprises the step of repositioning said most significant set of signals to the least significant position of said route address and a lesser significant set to the most significant set position.

14. The method of claim 13 wherein each of said sets of routing signals comprises two routing signals and said generating step comprises the steps of:
examining the most significant signal of the next set of lesser significant sets than said most significant set to insert a third predefined value into the corresponding set position of one of said single-destination packets upon said most significant routing signal of said next set being a fifth predefined value and a fourth predefined value upon said most significant routing signal of said next set being a sixth predefined value; and
examining the least significant signal of said next set of lesser significant sets than said most significant set to insert said third predefined value into the corresponding set position of said second one of said single-destination packets upon said least significant routing signal of said next set equaling said fifth predetermined value and said predefined fourth predefined value upon said least significant signal equaling said sixth predefined value.

15. A method of switching packets by a switching network having switching stages each comprising a plurality of switch nodes and each of said packets comprising routing information comprising sets of route signals with each set corresponding to one of said stages of said network, comprising the steps of:
communicating a packet to a plurality of switch nodes in the next sequential stage in response to a first type of route signals in the most significant set of route address information;
modifying said routing information in response to a second type of route signals in said most significant set to generate modified packets each having different routing information;
repositioning said most significant set of route signals in said routing information to the least significant position of said routing information and a lesser significant set of said routing information to the most significant set position; and
transferring said modified packets to a plurality of switch nodes in said next sequential stage in response to said second type of route signals in said most significant set and said modified routing information.

16. The method of claim 15 wherein each of said nodes having two output terminals connected to said next sequential stage and each of said sets of route signals comprising two signals and a third type of route signals being indicated by said most significant set having a first and a second predefined value and said method further comprises the steps of:

transmitting said packet to a first output terminal upon said most significant set having said first predefined value; and
transmitting said packet to a second output terminal upon said most significant set having said second predefined value.

17. The method of claim 16 wherein said second type of route signals being indicated by said most significant set having a third predefined value and said step of modifying further comprises the steps of:
examining the most significant signal of the next set of lesser significant sets than said most significant set to insert said first predefined value into the corresponding set position of the new packet being communicated to said first output terminal upon said most significant signal of said most significant set being a fourth predefined value and said second predefined value upon said most significant set being a fifth predefined value; and
examining the least significant signal of said next set of lesser significant sets than said most significant set to insert said first predefined value into the corresponding set position of the new packet being communicated to said second output terminal upon said least significant signal of said next set equaling said fourth predefined value and said second predefined value upon said least significant signal in said fifth predefined value.

18. A switch node for switching packets, each said packet comprising sets of route address information and said node connectable to a plurality of input and output links, comprising:
a first and second input control means each connected to one of said input links;
a first and second output control means each connected to one of said output links;
a plurality of intra-links connecting each of said input control means to an individual one of said output control means; the invention comprising
said packets being broadcast, split-destination, and single-destination types;
each set of route address information comprises a pair of route signals;
each one of said input control means comprises means responsive to receipt of a first one of said packets for storing a most significant set of the route address information;
means for buffering said first one of said packets upon receipt of the latter by said input control means;
said split-destination type of packet being indicated by the stored most significant set of said route address information equaling a first predefined value;
split-destination means for decoding the first predefined value of said first one of said packets stored in the storing means to generate a split-destination signal;
a first and second address modifying means;
means responsive to said split-destination signal and said first and second output means having present capacity to receive packet data for generating a communication signal for transmission to said first and second address modifying means;
means responsive to said communication signal for outputting said buffered packet data of said first one of said packets:
means for repositioning said most significant set of route address information to the least significant set of route information thereby making said next lesser significant set of route address information the new most significant set of route address information;

means responsive to said split-destination signal for multiplexing the repositioned packet to both said first and second address modifying means;

said first address modifying means responsive to said repositioned packet and said split-destination signal for examining the most significant signal of said new most significant set of route address information to insert into said new most significant set a second predefined value upon said most significant signal having a third predefined value and to insert into said new most significant set a fifth predefined value upon said most significant signal having a fourth predefined value;

said second address modifying means responsive to said repositioned packet and said split-destination signal for examining said least significant signal of said new most significant set to insert into said new most significant set said second predefined value upon said least significant signal having said third predefined value and to insert into said new most significant set said fifth predefined value upon said least significant signal having said fourth predefined signal;

said first address modifying means comprises means responsive to said communication signal for transferring the modified packet of said first address modifying means to said first output means;

said second modifying address means comprises means responsive to said communication signal for transferring the modified packet of said second address modifying means to said second output means;

said broadcast type of packet indicated by said most significant set of said route address information equaling a sixth predefined value;

said address storing means further responsive to a receipt of a second one of said packets for storing the most significant set of the route address information of said second one of said packets;

means for decoding the sixth predefined value in said address storing means of said second one of said packets to generate a broadcast signal;

the communication generating means further responsive to said broadcast signal and said first and second output means having present capacity to receive packet data for transmitting said communication signal to said first and second address modifying means;

said buffering means further responsive to said communication signal to output said stored packet data of said second one of said packets;

said repositioning means further responsive to the output of said buffering means for repositioning said most significant set of route address information to the least significant set of route information of said second one of said packets thereby making said next lesser significant set of route address information the most significant set of route address information of said second one of said packets;

said multiplexing means further responsive to said broadcast signal for transferring said second one of said packets from said repositioning means to said first address modifying means and said second address modifying means;

said first address modifying means further responsive to said broadcast signal and said communication signal for communicating said second one of said packets to said first output means;

said second modifying address means further responsive to said broadcast signal and said communication signal for transferring said second one of said packets to said second output means;

said single-destination type of packet designated by said most significant set equaling said second predefined value and said fifth predefined value;

said address storing means further responsive to receipt of a third one of said packets for storing the most significant set of the route address information;

means responsive to the contents of said address storing means for said third one of said packets being said second predefined value for generating a first single-destination signal;

said communication generating means further responsive to said first single-destination signal and said second output means having present capacity to receive packet data for transmitting said communication signal to said second address modifying means;

said buffering means further responsive to said communication signal to output said stored packet data of said third one of said packets;

said repositioning means further responsive to said communication signal and said outputted data for repositioning said most significant set of route address information of said third one of said packets to the least significant set of route address information thereby making said lesser significant set of route address information the most significant set of route address information of said third one of said packets;

said multiplexer means responsive to said first single-destination signal for transferring said third one of said packets from said repositioning means to said second address modifying means;

said second address modifying means responsive to said first single-destination signal and said communication signal for transferring said third one of said packets to said second output means;

said address storing means further responsive to receipt of a fourth one of said packets for storing the most significant set of the route address information of said fourth one of said packets;

means responsive to the contents of said address storing means for said fourth one of said packets equaling said fifth predefined value for generating a second single-destination signal;

said communicating generating means further responsive to said second single-destination signal and said first output means having present capacity to receive packet data for transmitting said communication signal to said first address modifying means;

said buffering means further responsive to said communication signal to output said stored packet data of said fourth one of said packets;

repositioning means further responsive to said communication signal and the outputted stored packet data from said buffering means for repositioning said most significant set of route address information of said fourth one of said packets to the least significant set of route information thereby making said next lesser significant set of route address information the new most significant set of route address information of said fourth one of said packets;

said multiplexer means responsive to said second single-destination signal to transfer said fourth one of said packets from said repositioning means to said first address modifying means; and said first address modifying means responsive to said second single-destination signal and said communication signal for transferring said fourth one of said packets to said first output control means.

* * * * *